Aug. 5, 1969

J. R. ZIEGLER 3,460,038

ELECTRIC INDICATOR UTILIZING A BIDIRECTIONAL AND MULTIPLE
UNIDIRECTION COILS TO PROVIDE EXTENDED POINTER
MOVEMENT IN OPPOSITE DIRECTIONS

Filed Dec. 17, 1965

INVENTOR.
John Richard Ziegler
BY
Hugh L. Fisher
ATTORNEY

United States Patent Office 3,460,038
Patented Aug. 5, 1969

3,460,038
ELECTRIC INDICATOR UTILIZING A BIDIRECTIONAL AND MULTIPLE UNIDIRECTION COILS TO PROVIDE EXTENDED POINTER MOVEMENT IN OPPOSITE DIRECTIONS
John Richard Ziegler, Flint, Mich., assignor to General Motors Corporation, Detroit, Mich., a corporation of Delaware
Filed Dec. 17, 1965, Ser. No. 514,537
Int. Cl. G01r *1/20, 7/00, 15/10*
U.S. Cl. 324—146      9 Claims

ABSTRACT OF THE DISCLOSURE

An electrical gauge utilizing air core coils to obtain needle movement in opposite directions from a center zero position throughout a range that is greater than 180°. A restoring magnet generates a flux along the 0°–180° axis line and two unidirectional coils generate flux oppositely along this same axis in directions controlled by oppositely poled diodes. A bidirectional coil generates flux along the 90°–270° axis line and in a direction determined by the polarity of the input signal.

---

This invention relates to electrical indicators adapted to measure a characteristic of electrical power generated from a remote source.

Electrical indicators, such as gauges of the type mounted on display panels, e.g., a vehicle dashboard, must of course be visually readable. Then too, these gauges should be capable of modification to permit design and styling freedom but without being costly or complicated.

With the foregoing in mind, a new and different electrical indicator is proposed that offers a scale angle of greater than 180°, thus affording improved readability as well as increasing styling and design versatility. Also contemplated is an electrical indicator employing unique circuitry that provides indicator movement in opposite directions from a center zero position throughout a range that is greater than 180°. Additionally, the proposed electrical indicator facilitates the use of air core coils.

The foregoing and other objects and advantages of the invention will become apparent from the following description and from the accompanying drawings, in which.

Figure 1:
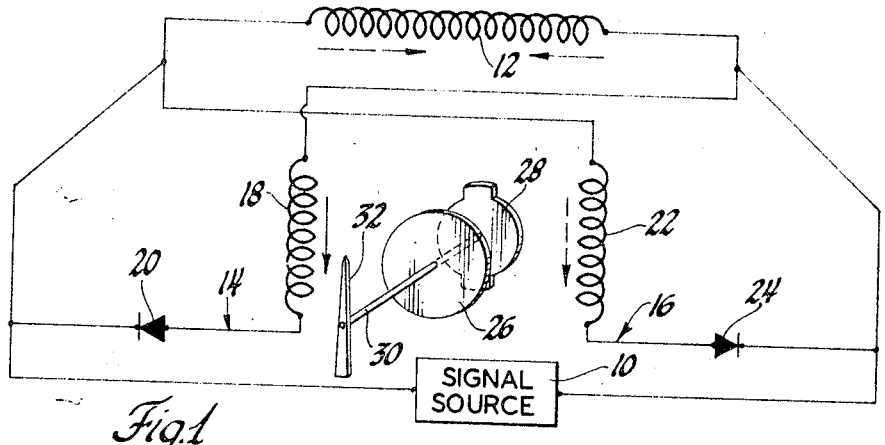
FIGURE 1 is a schematic circuit diagram for an eletrical indicator embodying the principles of the invention.

Referring first to FIGURE 1, the circuit is shown connected to a signal source 10, which may for exemplary purposes be the recified output from a vehicle alternator. Connected across this signal source 10 is a main deflection coil 12. This main deflection coil 12 is common to parallel branches 14 and 16, each of which is also connected across the source. The branch 14 has a deflection coil 18 in series with a one-way conducting device, such as a diode 20, that serves a switching function to be explained; whereas the branch 16 has a deflection coil 22 in series with a like but oppositely poled diode 24. Rotatably arranged within the sphere of influence of the magnetic flux from the different deflection coils 12, 18 and 22 is rotatably mounted, magnetized armature 26. This armature 26 is formed as a flat, round disk and is diametrically magnetized to provide opposite poles. The center zero or reference position for the armature 26 is established by a permanent magnet 28. The permanent magnet 28 is fixedly aligned with the armature 26 in close proximity thereto so as to exert a magnetic influence thereon for restoring or moving the armature 26 to its center zero position. This armature 26 is on one end of a shaft 30. On the other end of the shaft 30 is a needle 32, which moves across a scale face (not shown) and, as will be explained, has a range of scale movement greater than 180°.

Figure 2:
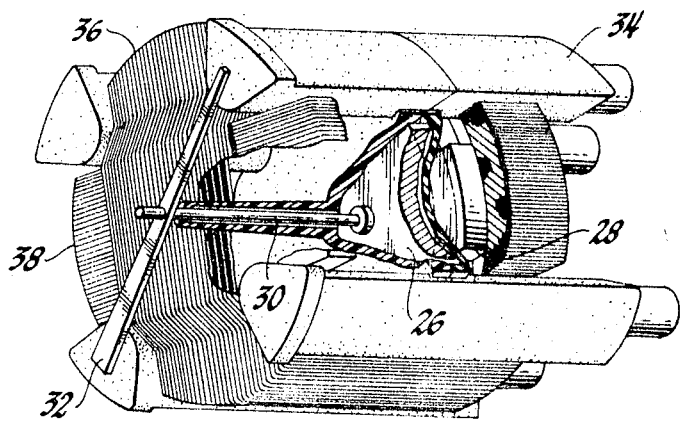
FIGURE 2 is a perspective view with a partially broken-away section of an electrical indicator incorporating the FIGURE 1 circuitry.

Referring now to FIGURE 2, the gauge utilizes a body 34 formed of some inexpensive, nonmetallic material, such as plastic, on which are wound the deflection coil 12 to form a winding 36 and the coils 18 and 22 to form a winding 38. The coils 18 and 22 may be wound bifilar or in some other suitable way as long as the same results to be discussed are obtained. Preferably, the windings 36 and 38 are interlaced, as shown, to obtain more uniform coil parameters and gauge characteristics. Also, the windings 36 and 38 are mutually perpendicular with their axes intersecting at a point in the center of the windings.

Revolvably supported by the body 34 is the shaft 30 and, as mentioned, the shaft 30 has attached to one end the needle 32 and to the other end the magnetized armature 26. The magnetized armature 26 is coaxial with the shaft 30 and the plane thereof is perpendicular thereto and, additionally, lies in the plane of the axes of the windings 36 and 38. Also, the shaft 30 is mutually perpendicular to the axes of the windings 36 and 38. Rightwardly from the magnetized armature 26 as viewed in FIGURE 2 is the permanent magnet 28, which is fixedly secured in any suitable way to the body 34.

Figure 3:
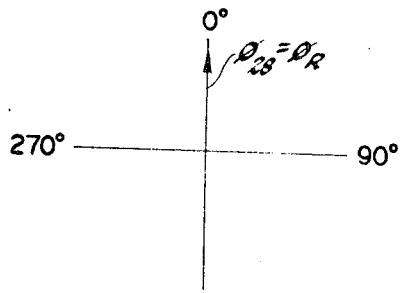
FIGURES 3, 4 and 5 are flux component vector diagrams.
Figure 5:
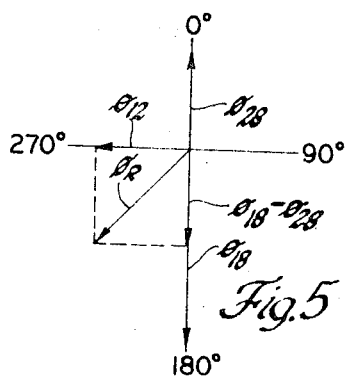

The operation of the gauge will be described while referring to the FIGURE 1 circuit diagram and the vector diagrams illustrated in FIGURES 3, 4 and 5. For explanatory purposes it will be assumed that the solid and broken direction lines in FIGURE 1 represent current direction, and further that the current direction and the flux direction are the same.

Considering now a first operating condition when there is no output from the signal source 10, there will be no current flow in the circuit; hence, the only flux will be that from the permanent magnet 28. The component of this flux is indicated at $\phi_{28}$ along the 0° axis line in the FIGURE 3 diagram and will also correspond to the resultant flux $\phi_R$. Thus the magnetized armature 26 will be maintained at or returned to the center zero position. This will align the needle 32 with the 0° axis or the resultant flux $\phi_R$.

Figure 4:
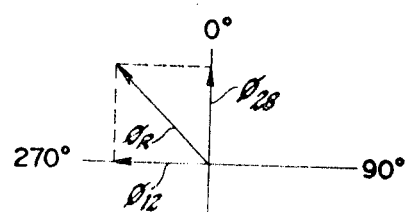

If the voltage generated by the signal source 10 is of a small value and of a polarity that generates current flow in the direction of the solid direction lines, there will be a flux component generated by the deflection coil 12, identified as $\phi_{12}$ along the 270° axis in FIGURE 4. The voltage from the source 10 is assumed to be less than the forward voltage drop across the diode 20 and, therefore, there is no current flow in the branch 14. The resultant flux $\phi_R$, as shown in FIGURE 4, is the vector sum of the permanent magnet flux $\phi_{28}$ and the flux component $\phi_{12}$ produced by the deflecting coil 12. The indicator needle will therefore align with the $\phi_R$ flux component vector depicted in the 0°–270° quadrant.

If next it is assumed that the voltage generated by the signal source continues to produce current flow in the aforementioned direction, i.e., in the direction of the solid direction lines, and further that this voltage is greater than the forward voltage drop across the diode 20, there will be in addition to the flux components $\phi_{28}$ from the permanent magnet and $\phi_{12}$ from the deflecting coil 12 a flux component $\phi_{18}$ generated by the deflection coil 18. The flux components $\phi_{28}$ and $\phi_{18}$ are algebraically added and identified as $\phi_{18}-\phi_{28}$ along the 180° axis in FIGURE 5. The vector sum of this latter component and the flux component $\phi_{12}$ is the resultant component $\phi_R$ with which the needle 32 will align in the 270°–180° quadrant.

If the polarity of the voltage from the signal source 10 is reversed then the opposite would occur, with the resultant flux $\phi_R$ moving from the center zero position into the 0°–90° quadrant when the signal voltage is less than the forward voltage drop across diode 24. When the signal voltage is greater than the forward voltage drop across the diode 24, the resultant flux $\phi_R$ will advance into the 90°–180° quadrant.

From the foregoing description it will be appreciated that the needle 32 has movement over a range that is very nearly 360°. This is accomplished with a relatively simple circuit and with an air core gauge structure that is not only easily fabricated but involves relatively inexpensive components. The large scale range being over 180° permits the stylist considerable freedom in designing the gauge dial and the adjacent structures. Of course, readability is considerably improved, it being possible to increase the size of the numerals and also the number of marks between the numerals.

The invention is to be limited only by the following claims.

What is claimed is:

1. An electrical indicator for measuring the magnitude of a signal from a variable signal source comprising a rotatably mounted magnetic armature, restoring means generating a magnetic field for urging the magnetic armature to a reference position, signal responsive means generating magnetic fields for angularly displacing the magnetic armature in either direction relative to the reference position and throughout a range substantially greater than 180° as determined by the magnitude and polarity of the signal from the source, the signal responsive means including bidirectional magnetic field producing means connected across the source and arranged to generate a magnetic flux that is displaced a certain angle from the magnetic flux produced by the restoring means and in a direction relative thereto determined by the polarity of the signal and a pair of unidirectional magnetic field producing means each arranged in parallel with the bidirectional field producing means, the pair of unidirectional magnetic field producing means being adapted to be energized by opposite polarity signals of a certain magnitude so that each produces a magnetic flux that is displaced a predetermined angle from the magnetic flux generated by the restoring means.

2. An electrical indicator as described in claim 1 wherein both the bidirectional magnetic field producing means and the pair of unidirectional magnetic field producing means are air core coils.

3. The electrical indicator as described in claim 1 wherein the restoring means is a permanent magnet fixedly mounted proximate the magnetic armature and the pair of unidirectional magnetic field producing means includes air core coils each having a unidirectional conducting device in series therewith, the unidirectional conducting devices being arranged to be rendered conductive by opposite polarity signals of a certain minimum magnitude.

4. An electrical indicator for measuring the magnitude of a signal from a variable signal source comprising a rotatably mounted magnetic armature, restoring means generating a magnetic field for urging the magnetic armature to a reference position, signal responsive means generating magnetic fields for angularly displacing the magnetic armature in either direction relative to the reference position and throughout a range substantially greater than 180° as determined by the magnitude and polarity of the signal from the source, the restoring means including a permanent magnet fixedly mounted proximate the magnetic armature and the signal responsive means includes a main air core coil connected across the source and adapted to generate a magnetic flux that is displaced in a direction 90° from the magnetic flux produced by the restoring means as determined by the polarity of the signal, and a pair of air core coils each arranged in parallel with the main air core coil and each including in series therewith a diode, the diodes being arranged to become conductive one by one polarity and the other by an opposite polarity signal at a certain minimum signal level so that the pair of air core coils each develops a magnetic flux that is displaced 180° from the magnetic flux generated by the restoring means.

5. An electrical indicator for measuring the magnitude of a signal from a variable signal source comprising first and second means producing fluxes respectively along first and second intersecting magnetic axes, the first means including means generating a constant flux component in one direction along the first axis and first signal responsive means generating a flux component in an opposite direction along the first axis and of a magnitude determined by the magnitude of the signal, the second means including second signal responsive means generating a variable flux component along the second axis and in a direction and of a magnitude determined respectively by the polarity and the magnitude of the signal, a magnetic armature rotatably mounted proximate the first and second means and angularly displaceable by the resultant magnetic flux in either direction throughout a range greater than 180° as determined by the magnitude and polarity of the signal.

6. The electrical indicator as described in claim 5 wherein the second signal responsive means includes a coil connected across the source and the first signal responsive means includes a pair of branch circuits, each connected also across the source and each arranged in parallel with the coil.

7. The electrical indicator as described in claim 6 wherein the branch circuits each include a coil and switching means in series, the switching means in one of the branch circuits being arranged to permit conduction on the occurence of a signal of a certain magnitude of one polarity, the switching means in the other branch circuit being arranged to permit conduction therethrough by a signal of the certain magnitude and of an opposite polarity.

8. The electrical indicator as described in claim 7 wherein the constant flux component generating means is a permanent magnet fixedly positioned relative to the magnetic armature and the switching means are one-way conducting devices.

9. The electrical indicator as described in claim 5 wherein the constant flux component generating means is a permanent magnet fixedly positioned relative to the magnetic armature, the first signal responsive means includes an air core coil connected across the source, the second signal responsive means includes a pair of branch circuits each connected across the source and each arranged in parallel with the air core coil, the branch circuits each including an air core coil and a diode, the diodes being arranged so that one is rendered conductive upon the occurrence of a signal of one polarity and the other is rendered conductive upon the occurrence of a signal of the opposite polarity.

References Cited

UNITED STATES PATENTS

| 3,013,210 | 12/1961 | Wargo | 324—146 |
| 3,031,620 | 4/1962 | Finley | 324—132 X |
| 3,168,689 | 2/1965 | Gelenius | 324—146 X |
| 3,302,191 | 1/1967 | Ziegler | 324—146 X |

RUDOLPH V. ROLINEC, Primary Examiner

J. J. DEVITT, Assistant Examiner

U.S. Cl. X.R.

324—132, 140